United States Patent [19]

Kondo

[11] Patent Number: 5,688,414
[45] Date of Patent: Nov. 18, 1997

[54] STUD WELDING APPARTUS

[75] Inventor: Yoshiteru Kondo, Toyohashi, Japan

[73] Assignee: Emhart Inc., Newark, Del.

[21] Appl. No.: 629,496

[22] Filed: Apr. 10, 1996

[30] Foreign Application Priority Data

Apr. 13, 1995 [JP] Japan ................. 7-088048

[51] Int. Cl.$^6$ ................. B23K 9/20
[52] U.S. Cl. ................. 219/98
[58] Field of Search ................. 219/98, 99

[56] References Cited

U.S. PATENT DOCUMENTS

| | | | |
|---|---|---|---|
| 2,110,832 | 3/1938 | Hogg et al. | 219/98 |
| 3,321,607 | 5/1967 | Facone et al. | 219/98 |
| 3,997,754 | 12/1976 | Moliner et al. | 219/98 |

*Primary Examiner*—Clifford C. Shaw
*Attorney, Agent, or Firm*—E. D. Murphy

[57] ABSTRACT

A welding apparatus comprising a hollowed tubular stud-receiving portion including an axially extending slit at the end thereof and a reduced inner diameter portion at the inner side of the end thereof; and an adapter opened to communicate with the stud-receiving portion for feeding a flanged stud having a shank and a flange formed at an end of the shank into the stud-receiving portion with the flange at the leading end. A collet is positioned to be axially slidable in the stud-receiving portion and provided with a bore at the end thereof to receive the stud shank in the bore, and at least the end portion of the collet is made of an electrically conductive material. Collet driving means is provided for driving the above collet to move the same between a retracted position in which the collet end is placed rearward of the opening of the adapter and a projecting position in which the collet end projects from the end of the stud-receiving portion to apply urging force to the stud. Magnetic field establishing means establishes a stud pulling magnetic field around the retracted collet to draw the stud from the stud-receiving portion into the bore of the collet.

6 Claims, 5 Drawing Sheets

STUD WELDING APPARTUS

FIELD OF THE INVENTION

The present invention relates to a stud welding apparatus, more particularly, such a stud welding apparatus that a flanged stud having a shank and a flange formed on an end of the shank is welded to a workpiece, e.g. a panel by means of arc welding, resistance welding or similar welding process.

DESCRIPTION OF THE PRIOR ART

The conventional stud welding apparatus is of the structure that a collet for gripping the stud is formed with slits at its end portion to give the end of the collet resilience to deflect the collet end radially inwardly so that the resilience of the collet is effective to grip the stud shank. In the conventional structure, it is a problem that a sufficiently large contact area is not available when welding current is supplied from the collet to the stud. More specifically, in order to ensure firm contact between the collet and the stud, it is preferable that the collet end can be in contact with the shank side or rear side of the stud flange. However, in the conventional structure having the slits at the collet end, there is a limited contact area between the collet end and the flange surface of the stud. Thus, the conventional stud welding apparatus cannot be used for a resistance welding that requires large welding current and urging force for the stud against a base member although it is usable for arc welding requiring a relatively small current.

SUMMARY OF THE INVENTION

The present invention aims to ensure that in a stud welding apparatus of such a type that a flanged stud is directly fed from a feed tube or the like to the apparatus, the stud is reliably gripped without any slits at the collet end, and that a sufficient contact area is allowed between the rear side of the stud flange and the collet end so that sufficient welding current is supplied to the stud and sufficient urging force is applied to the rear side of the stud flange.

In order to solve the above problem, according to the present invention, a welding apparatus comprises a hollowed tubular stud-receiving portion including an axially extending slit at the end thereof and a reduced inner diameter portion at the inner side of the end thereof; and an adapter opened to communicate with the stud-receiving portion for feeding a flanged stud having a shank and a flange formed at an end of the shank into the stud-receiving portion with the flange at the leading end. A collet is positioned to be axially slidable in the stud-receiving portion and provided with a bore at the end thereof to receive the stud shank in the bore, and at least the end portion of the collet is made of an electrically conductive material. Collet driving means is provided for driving the above collet to move the same between a retracted position in which the collet end is placed rearward of the opening of the adapter and a projecting position in which the collet end projects from the end of the stud-receiving portion to apply urging force to the stud. Magnetic field establishing means establishes a stud pulling magnetic field around the retracted collet to draw the stud from the stud-receiving portion into the bore of the collet. Electric current supply means is connected to the collet to supply welding current to the end of the collet.

The magnetic field establishing means may be composed of an electromagnet positioned on the stud-receiving portion around the retracted collet. In another embodiment, the magnetic field establishing means may be composed of an electromagnet positioned about the end of the collet. The inner side of the bore of the collet may be provided with resilient holding means to resiliently hold the stud shank. It is preferable that the collet driving means is composed of a piston and cylinder assembly. Preferably, a capacitor discharge type electromagnet energizing circuit is provided to supply current to the electromagnet to energize it.

When the collet is at the retracted position, the flanged stud is fed to the stud-receiving portion and the magnetic field establishing means is energized to retract the stud shank into the collet bore until the rear side of the flange comes into contact with the end of the collet. Then, the collet driving means is actuated to drive the collet to the projecting position to bring the front side of the stud flange gripped in the collet into contact with a member to be welded, and then current is supplied from the electric current supply means to the collet to allow the welding current to flow through the flange of the stud so as to effect a stud welding.

DESCRIPTION OF THE PREFERRED EMBODIMENT

Figure 1:
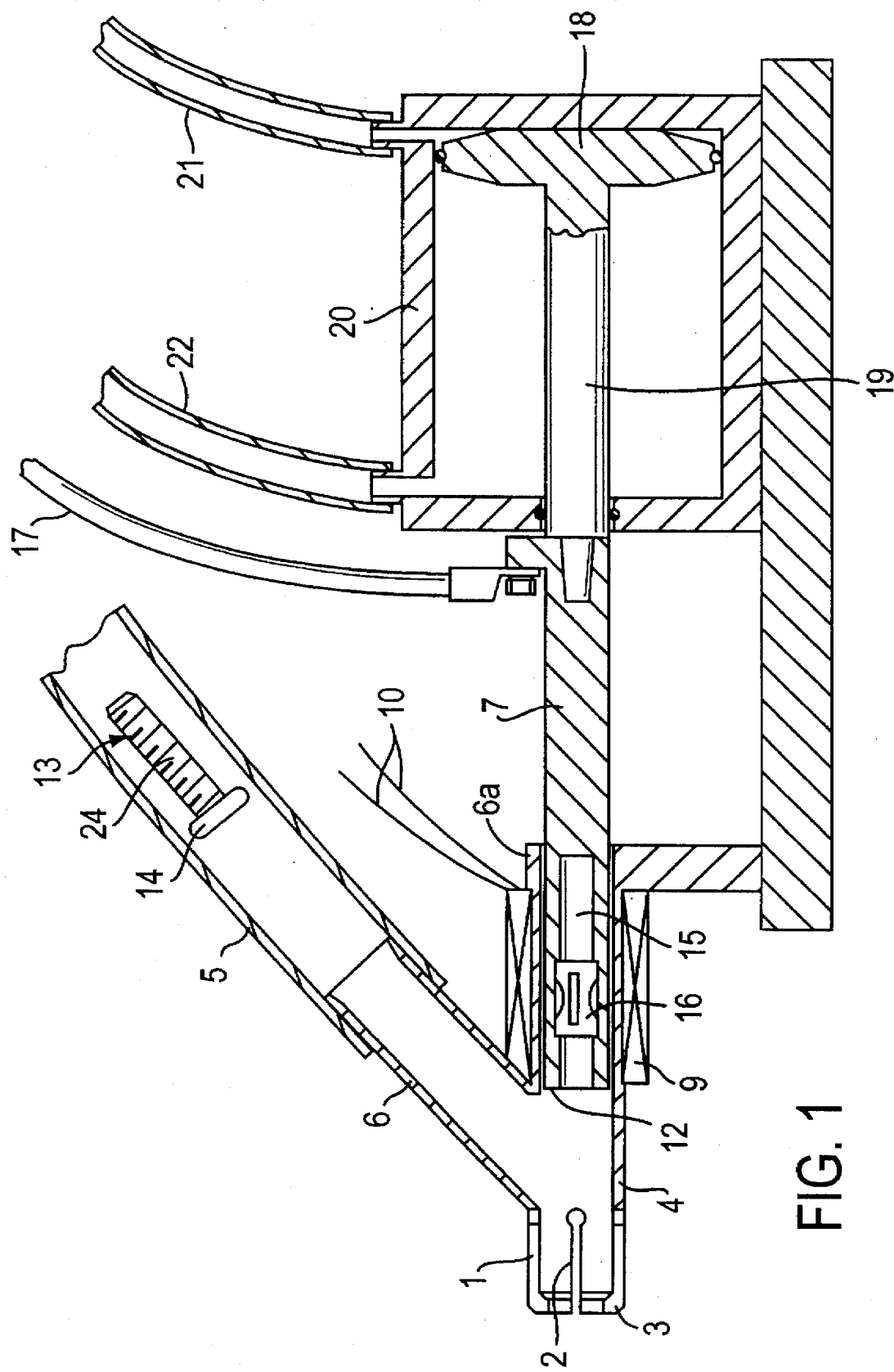
FIG. 1 is a sectional view of a stud welding apparatus according to one embodiment of the present invention.

With reference to FIGS. 1 through 4, a stud welding apparatus as an embodiment of the present invention has a cylindrical tubular stud-receiving portion 4 and an outer tube 1 attached to an end of the stud-receiving portion 4. The outer tube 1 is formed with a plurality of slits 2 axially extending from the end thereof. The inner side of the end is formed with a reduced diameter portion 3 whose inner diameter is reduced.

An adapter 6 is opened diagonally into the stud-receiving portion 4. The adapter 6 is connected to a stud feed tube 5 to guide a stud 13 fed from the stud feed tube 5 to the stud-receiving portion 4. The stud 13 is of the type having a threaded shank 24 and a flange 14 formed at one end of the shank 24. The stud feed tube 5 feeds the flanged stud 13 with the flange moving ahead into the adapter 6.

The stud-receiving portion 4 has a tubular portion 6a extending rearward of the opening of the adapter 6, and the collet 7 is positioned to be axially slidable in that portion of the stud-receiving portion 4. The collet 7 has a bore 15 opening to an end surface 12 which is flat, annular and continuous (i.e., without slits). The collet 7 is made of electrically conductive material. The inner side of the bore 15 of the collet 7 is provided with a resilient gripper 16 to resiliently grip the shank 24 of the stud 13. The resilient gripper 16 can be made of a metal spring.

A piston and cylinder assembly is positioned rearward of the collet 7. The piston and cylinder assembly has a cylinder 20 and a piston 18 placed in the cylinder 20. A piston rod 19 mounted on the piston 18 is connected to the collet 7. Pipes 21 and 22 are connected to the respective ends of the cylinder 20 to feed compressed air. FIG. 1 illustrates that the piston 18 is at a retracted position. In this retracted position, the collet 7 is also at a retracted position so that the end surface 12 is retracted behind the rear side of the opening of the adapter 6. When compressed air is introduced from the pipe 21, the piston 18 moves to the left in FIG. 1. Consequently, the collet 7 is moved to a projecting position that the end of the collet protrudes from the outer tube 1, so that the stud end 26 comes in contact with a panel 25 to urge the end surface 12 of the collet 7 against the rear side of the flange 14 of the stud 13.

On the outer surface of the stud-receiving portion 4, an electromagnet 9 is placed at a position rearward of the opening of the adapter 6, that is, the electromagnet is placed around the retracted collet 7. Electric current is supplied from wires 10 to energize the electromagnet 9. The collet 7 is connected with a welding current supply cable 17.

Figure 2:
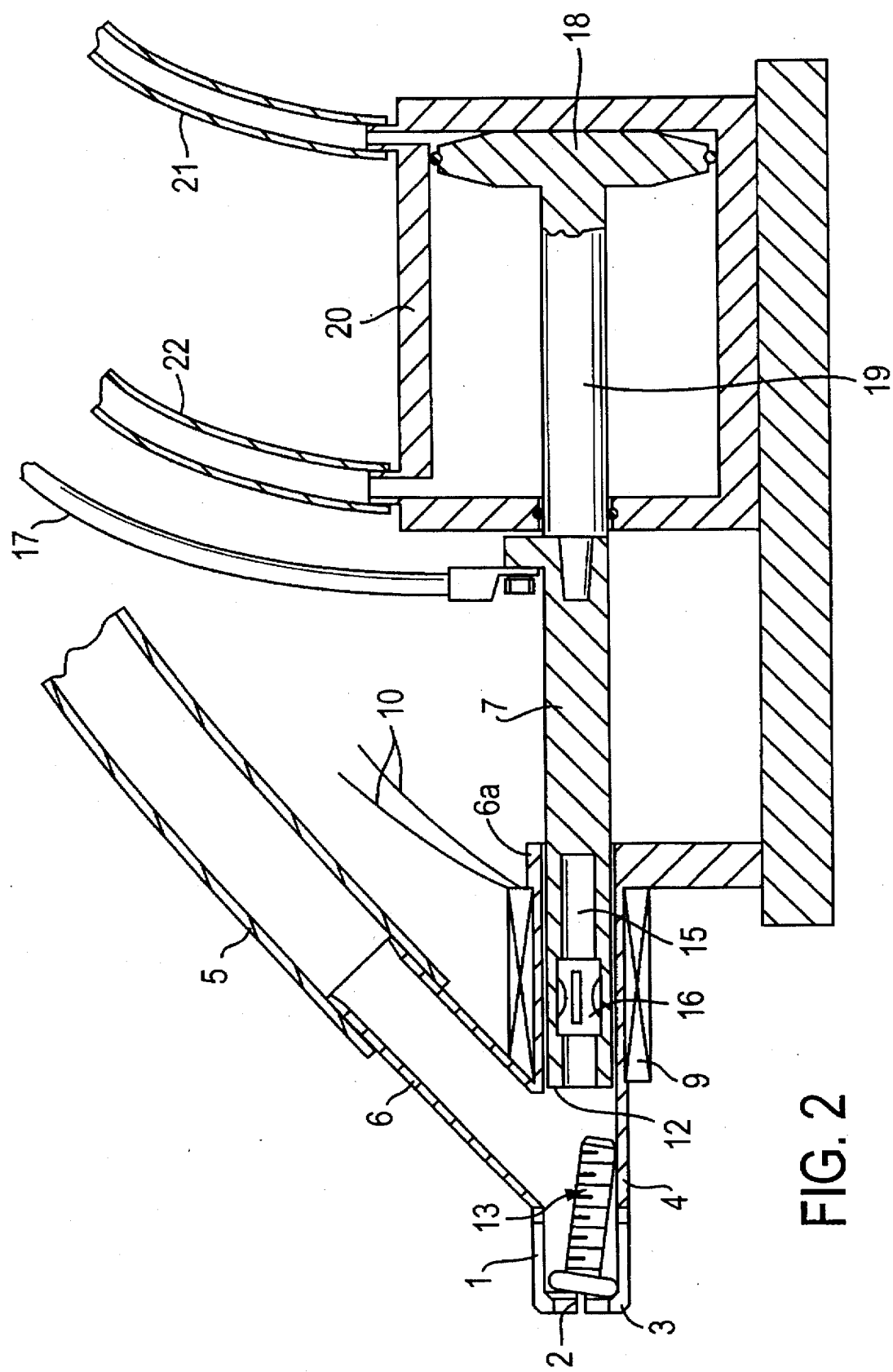
FIG. 2 is a sectional view showing that a flanged stud is fed into a stud-receiving portion of the stud welding apparatus of FIG. 1.

In operation of the stud welding apparatus of this embodiment, firstly, the flanged stud 13 is fed from the stud feed tube 5 with the flange 14 moving ahead as shown in FIG. 1, and then to the stud-receiving portion 4 through the adapter 6. That state is shown in FIG. 2. As the outer tube 1 has the end of the reduced diameter portion 3, the stud 13 is retained in the outer tube 1.

Figure 3:
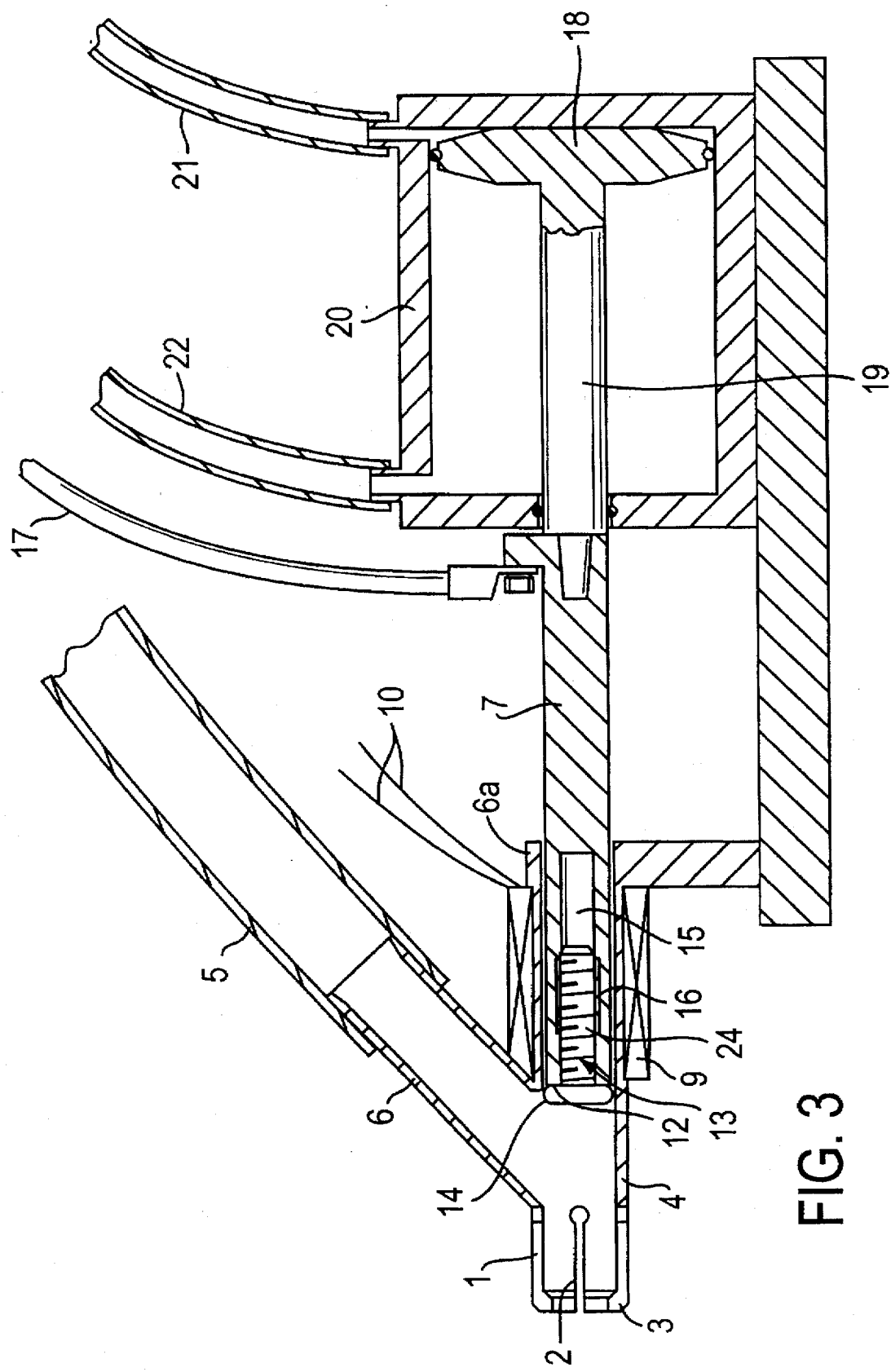
FIG. 3 is a sectional view showing that the stud is gripped by a collet in the stud welding apparatus of FIGS. 1 and 2.

When electric current is supplied to energize the electromagnet 9, a pulling force is exerted on the flanged stud 13 in the stud-receiving portion 4 and then the shank 24 of the stud 13 is drawn into the bore 15 of the collet 7. That state is shown in FIG. 3. In this state, the flange 14 of the stud 13 is brought into contact with the end surface 12 of the collet 7. The resilient gripper 16 in the collet bore 15 resiliently grips or holds the shank 24 of the stud 13. Accordingly, the stud 13 is firmly held by the collet 7 with both the holding force of the electromagnet 9 and the gripping force of the resilient gripper 16.

Figure 4:
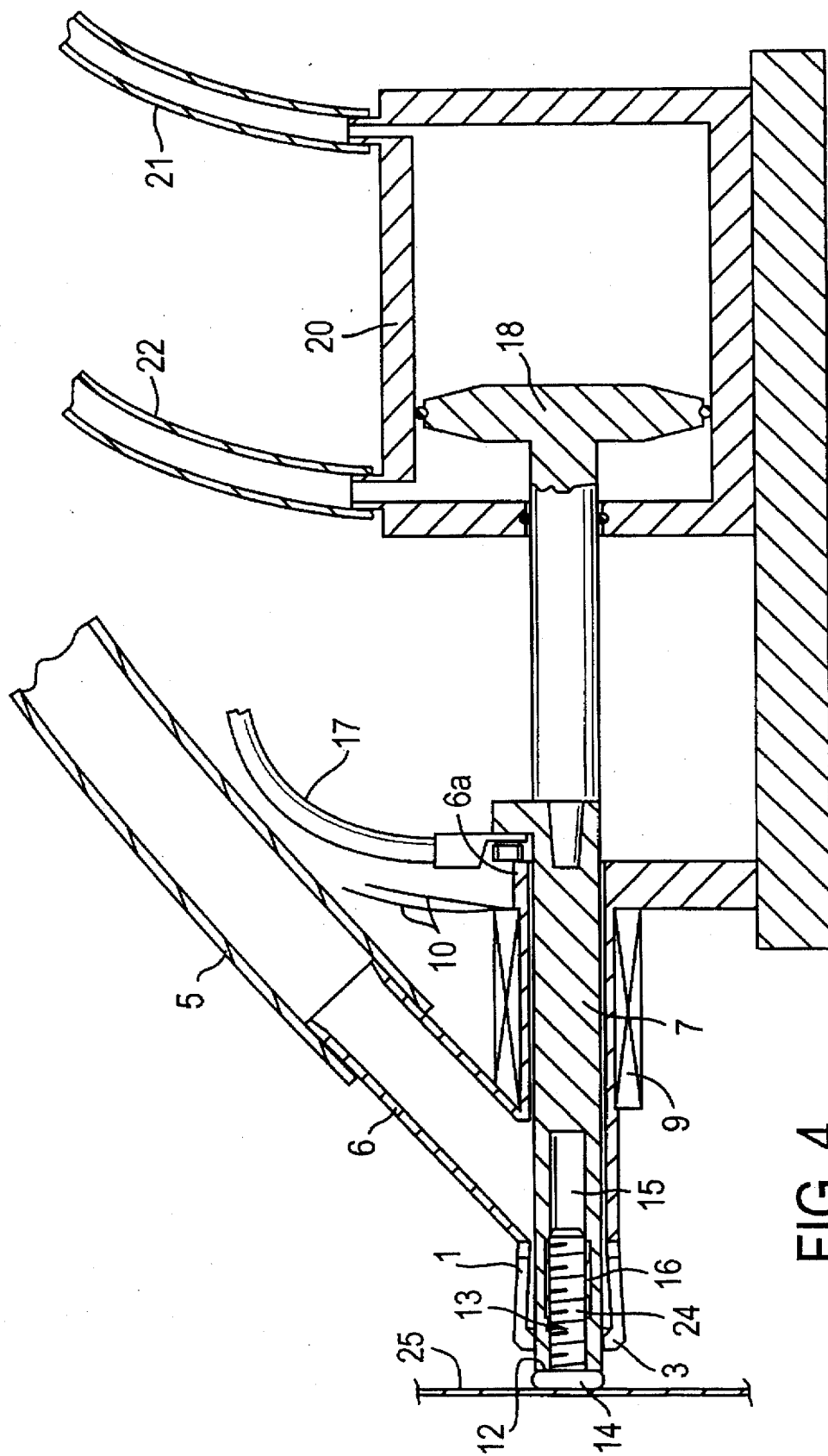
FIG. 4 is a sectional view showing that the stud is being welded.

Next, compressed air is introduced from the pipe 21 to the cylinder 20 of the piston and cylinder assembly. This drives the piston 18 to push the collet 7 out of the stud-receiving portion 4. In this state, as shown in FIG. 4, the end of the collet 7 protrudes from the outer tube 1. The outer surface of the flange 14 of the stud 13 gripped in the collet 7 is pressed against a workpiece to be welded, such as a panel 25. Welding current flows from the end surface 12 of the collet 7 to the panel 25 through the rear side of the flange 14 of the stud 13. Because of the slitless, flat and annular end surface 12 of the collet 7, a sufficient contact area or coverage can be attained between the end surface 12 and the rear of the flange 14 of the stud 13 and further the rear side of the stud flange can be sufficiently urged.

Figure 5:
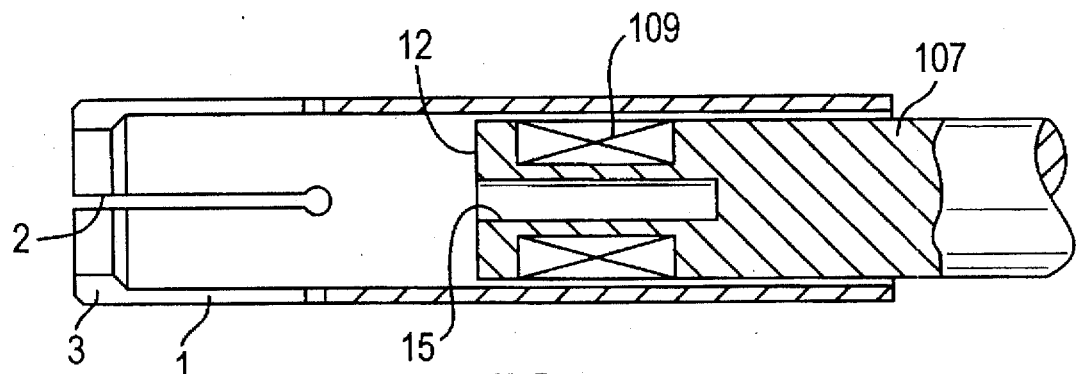
FIG. 5 is a sectional view of a collet portion of another embodiment of the present invention.

FIG. 5 shows another embodiment of the present invention. In this embodiment, an electromagnet 109 is buried in the outer surface of the bore 15 of a collet 107. Power can be supplied to the electromagnet 109 via a wire passing through the collet 107. Except these, the embodiment operates in the same way as the preceding embodiment.

Figure 6:
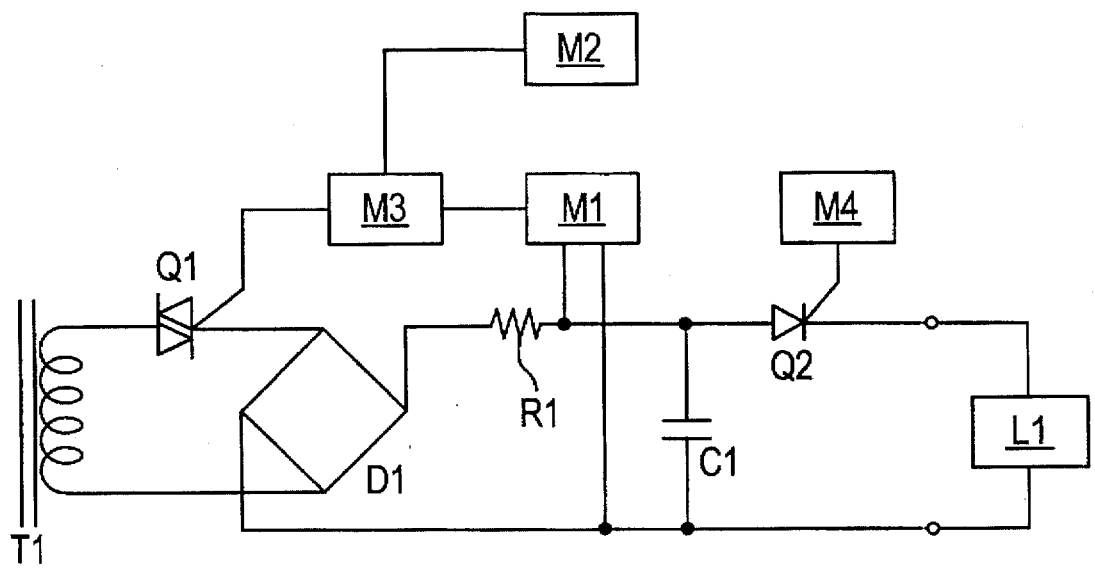
FIG. 6 is a circuit diagram showing one embodiment of an electromagnet energizing circuit used for the embodiments of the present invention.

FIG. 6 shows an embodiment of an electric power supply circuit for energizing both the electromagnets 9 and 109. High energizing current is required to attain sufficient pulling force under such a condition that increase of the number of turns of the coils of the electromagnets 9 and 109 is avoided and heat generation from the coils is maintained to a minimum level. In this embodiment, a power supply having a capacitor is used as shown in FIG. 6. The circuit has a triac Q1 connected to the secondary winding of a power transformer T1 and the capacitor C1 is charged from the triac Q1 via a rectifier D1 and resistor R1. The resistor R1 limits charge current to prevent excessive current.

A voltage detector M1 is provided to detect the charging voltage of the capacitor C1. The voltage detector M1 is connected with a triac drive M3. The triac driver M3 is connected with a charging with a charging voltage setting portion M2. The triac driver M3 is put in operation by the signals from the voltage detector M1 and the charging voltage setting portion M2 to control the triac Q1 to keep the charging voltage of the capacitor C1 at a preset value.

A coil L1 of the electromagnet is connected to the capacitor C1 via a thyristor Q2. A thyristor driver M4 is provided for the control of the thyristor Q2. Although there is no illustration in the drawings, control means is provided to turn the triac Q1 off when the thyristor Q2 is turned on. Thus, in order to energize the electromagnet 9, 109, the triac Q1 is turned off and the thyristor Q2 is turned on so that the charging current is discharged from the capacitor C1 to the coil L1. Owing to this circuit, the electromagnet can be energized within a short period of time.

Since the present invention does not require the formation of slits in the end of the collet, a large contact area can be attained between the collet and the stud when the collet end is brought into contact with the rear side of the flange of the stud, resulting in obtaining a sufficient welding current. The electromagnet is used to hold the stud in the collet so that holding force is increased. Unlike a permanent magnet, an electromagnet is free from adhesion of metal powder. The use of a capacitor discharge type electromagnet energizing circuit allows a large energizing current to flow in a short period of time to reduce the number of turns of energizing coil to suppress heat generation from the coil.

I claim:

1. A stud welding apparatus comprising a hollowed tubular stud-receiving portion including an axially extending slit at the end thereof and a reduced inner diameter portion at the inner side of the end thereof; an adapter opened to communicate with the stud-receiving portion for feeding a flanged stud having a shank and a flange formed at an end of the shank into the stud-receiving portion with the flange moving ahead; a collet positioned to be axially slid in the stud-receiving portion and provided with a bore at the end thereof to receive the stud shank in the bore with the end portion of the collet being made of an electrically conductive material; collet driving means for driving the collet to move the same between a retracted position that the collet end is placed rearward of the opening of the adapter and a projecting position that the collet end projects from the end of the stud-receiving portion to apply urging force to the collet; magnetic field establishing means for establishing a stud pulling magnetic field around the retracted collet to draw the stud from the stud-receiving portion into the bore of the collet; and electric current supply means to supply welding current to the end of the collet; and wherein when the collet is at the retracted position, the flanged stud is fed to the stud-receiving portion and the magnetic field establishing means is energized to retract the stud shank into the collet bore until the rear side of the flange comes into contact with the end of the collet, and then, the collet driving means is actuated to drive the collet to the projecting position to bring the front side of the stud flange gripped in the collet into contact with a member to be welded, and then current is supplied from the electric current supply means to the collet to allow the welding current to flow through the flange of the stud so as to effect a stud welding.

2. The stud welding apparatus according to claim 1 wherein the magnetic field establishing means is composed of an electromagnet positioned on the stud-receiving portion around the retracted collet.

3. The stud welding apparatus according to claim 1 wherein the magnetic field establishing means is composed of an electromagnet positioned about the end of the collet.

4. The stud welding apparatus according to claim 3 wherein a capacitor discharge type circuit is provided to supply current to the electromagnet to energize it.

5. A stud welding apparatus according to claim 1 wherein the inner side of the bore of the collet is provided with resilient holding means to hold the stud shank resiliently.

6. A stud welding apparatus according to claim 1 wherein the collet driving means is a piston and cylinder assembly.

* * * * *